(12) United States Patent
Asagi et al.

(10) Patent No.: US 11,128,044 B2
(45) Date of Patent: *Sep. 21, 2021

(54) SCANNING ANTENNA AND METHOD OF PRODUCING SCANNING ANTENNA

(71) Applicant: SHARP KABUSHIKI KAISHA, Sakai (JP)

(72) Inventors: Hiroaki Asagi, Sakai (JP); Isamu Miyake, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 339 days.

This patent is subject to a terminal disclaimer.

(21) Appl. No.: 16/317,713

(22) PCT Filed: Jul. 11, 2017

(86) PCT No.: PCT/JP2017/025248
§ 371 (c)(1),
(2) Date: Jan. 14, 2019

(87) PCT Pub. No.: WO2018/012490
PCT Pub. Date: Jan. 18, 2018

(65) Prior Publication Data
US 2019/0265524 A1    Aug. 29, 2019

(30) Foreign Application Priority Data
Jul. 15, 2016 (JP) .............................. JP2016-140625

(51) Int. Cl.
*H01Q 3/44* (2006.01)
*G02F 1/1337* (2006.01)
(Continued)

(52) U.S. Cl.
CPC ............. *H01Q 3/44* (2013.01); *G02F 1/1337* (2013.01); *G02F 1/1341* (2013.01);
(Continued)

(58) Field of Classification Search
CPC ............ H01Q 3/44; H01Q 3/34; H01Q 13/22; H01Q 21/06; H01Q 21/20; H01Q 21/064;
(Continued)

(56) References Cited

U.S. PATENT DOCUMENTS 5,465,169 A * 11/1995 Eguchi .............. G02F 1/133711
349/124
10,777,887 B2 * 9/2020 Orui ......................... H01Q 3/34
(Continued)

FOREIGN PATENT DOCUMENTS

CN          103794511 A      5/2014
JP          2009-538565 A    11/2009
(Continued)

*Primary Examiner* — Seokjin Kim
(74) *Attorney, Agent, or Firm* — ScienBiziP, P.C.

(57) ABSTRACT

A scanning antenna 1000 according to the present invention is a scanning antenna 1000 in which antenna units U are arranged, and includes a thin film transistor (TFT) substrate 101 that includes a first dielectric substrate 1, TFTs 10 and patch electrodes 15 supported by the first dielectric substrate 1, and a first alignment film M1 disposed so as to cover the patch electrodes 15 and other elements, a slot substrate 201 that includes a second dielectric substrate 51, a slot electrode 55 supported by the second dielectric substrate 51 and including slots 57, and a second alignment film M2 disposed so as to cover the slot electrode 55, a liquid crystal layer LC that is interposed between the TFT substrate 101 and the slot substrate 201 of which the alignment films M1 and M2 face each other, and a reflective conductive plate 65 that is disposed so as to face an opposite surface 51*b* of the second dielectric substrate 51 with a dielectric layer 54 interposed therebetween. The first alignment film M1 and the second alignment film M2 are acrylic alignment films containing an acrylic polymer.

8 Claims, 7 Drawing Sheets

(51) Int. Cl.
*G02F 1/1341* (2006.01)
*G02F 1/1368* (2006.01)
*H01Q 3/34* (2006.01)
*H01Q 13/22* (2006.01)
*H01Q 21/06* (2006.01)

(52) U.S. Cl.
CPC .............. *G02F 1/1368* (2013.01); *H01Q 3/34* (2013.01); *H01Q 13/22* (2013.01); *H01Q 21/06* (2013.01)

(58) Field of Classification Search
CPC .............. H01Q 21/245; H01Q 21/0012; G02F 1/1337; G02F 1/1341; G02F 1/1368
See application file for complete search history.

(56) References Cited

U.S. PATENT DOCUMENTS

| | | | |
|---|---|---|---|
| 2004/0041969 A1* | 3/2004 | Tahon | G02F 1/133784 349/123 |
| 2007/0273599 A1 | 11/2007 | Haziza | |
| 2008/0036664 A1 | 2/2008 | Haziza | |
| 2012/0194399 A1 | 8/2012 | Bily et al. | |
| 2014/0117350 A1 | 5/2014 | Koezuka et al. | |
| 2014/0161993 A1* | 6/2014 | Yoo | G02F 1/133711 428/1.2 |
| 2014/0266946 A1 | 9/2014 | Bily et al. | |
| 2015/0229028 A1 | 8/2015 | Bily et al. | |
| 2016/0359234 A1 | 12/2016 | Bily et al. | |
| 2016/0372834 A1 | 12/2016 | Bily et al. | |
| 2017/0331186 A1* | 11/2017 | Linn | H01Q 21/0012 |
| 2018/0186936 A1* | 7/2018 | Ju | C08G 73/1042 |
| 2018/0298283 A1* | 10/2018 | Ohishi | C09K 19/42 |
| 2019/0235291 A1* | 8/2019 | Miyake | H01Q 13/22 |
| 2019/0243174 A1* | 8/2019 | Ishii | G02F 1/13306 |
| 2020/0115387 A1* | 4/2020 | Mitchell | C07D 495/22 |
| 2020/0271975 A1* | 8/2020 | Park | G02F 1/13378 |
| 2020/0286923 A1* | 9/2020 | Kashishita | C08L 101/12 |

FOREIGN PATENT DOCUMENTS

| | | |
|---|---|---|
| JP | 2013-539949 A | 10/2013 |
| JP | 2016-512408 A | 4/2016 |

* cited by examiner

SCANNING ANTENNA AND METHOD OF PRODUCING SCANNING ANTENNA

TECHNICAL FIELD

The present invention relates to a scanning antenna and a method of producing the scanning antenna.

BACKGROUND ART

Antennas used for mobile communication, satellite broadcasting and the like require a beam scanning function that can change a beam direction. As an antenna having such a function, a scanning antenna utilizing a large dielectric anisotropy (birefringence) of a liquid crystal material (including a nematic liquid crystal and a polymer dispersed liquid crystal) has been suggested (for example, Patent Documents 1 to 3). This type of scanning antenna has a configuration in which an antenna unit (element antenna) has a liquid crystal capacitance, and may be referred to as a "liquid crystal array antenna".

In addition, Patent Document 3 describes that a low-cost scanning antenna can be obtained by using technology of a liquid crystal display device.

RELATED ART DOCUMENT

Patent Document

Patent Document 1: Japanese Translation of PCT International Application Publication No. JP-T-2013-539949

Patent Document 2: Japanese Translation of PCT International Application Publication No. JP-T-2016-512408

Patent Document 3: Japanese Translation of PCT International Application Publication No. JP-T-2009-538565

Problem to be Solved by the Invention

As described above, although an idea of applying liquid crystal technology such as liquid crystal display technology to the scanning antenna is known in itself, a configuration of a scanning antenna to which the liquid crystal technology is specifically applied, a specific method of producing such a scanning antenna and the like, have not been disclosed at all until now.

The antenna unit (element antenna) of the scanning antenna is used for transmission and reception of microwaves and the like, and requires performance or the like different from that of a pixel unit of a liquid crystal display device corresponding to the antenna unit. For this reason, there is a case where the liquid crystal technology according to the related art cannot be simply applied to the scanning antenna.

For example, the scanning antenna has a configuration corresponding to that of a liquid crystal display panel according to the related art, that is, a configuration in which it includes a pair of substrates with a liquid crystal layer interposed therebetween. One of the substrates is a thin film transistor (TFT) substrate including patch electrodes, and the other of the substrates is a slot substrate including slot electrodes. Sizes of the electrodes formed on these substrates are much larger than those of electrodes of the liquid crystal display panel according to the related art, and deep concave portions and high convex portions are present on surfaces of the respective substrates facing the liquid crystal layer. Alignment films that control alignment of liquid crystal molecules (liquid crystal compounds) are formed on the substrates having the concave-convex portions as described above, as in the liquid crystal display panel according to the related art.

For example, a polymer film obtained by imidizing a polyamic acid is widely used as an alignment film of the liquid crystal display panel. However, in the related art, when the alignment film used in the liquid crystal display panel is used in the scanning antenna as it is, air bubbles are generated in the liquid crystal layer, and the air bubbles hinder a capacitance change at the time of applying a voltage to the liquid crystal layer to deteriorate performance of the scanning antenna.

In the scanning antenna, a thickness of the electrode formed on each substrate is, for example, 1 µm or more, and a width of the electrode formed on each substrate is, for example, 100 µm or more. When it is attempted to form the alignment film on each substrate having such large electrodes so as to cover the electrodes, an alignment agent (alignment film solution) for the alignment film enters the concave portions, such that an alignment film including significantly thick portions is obtained.

Since an amount of absorbed moisture of such an alignment film is also increased, the alignment film can be subjected to a environment change (for example, a pressure change or a temperature change) in producing processes (for example, a decompressing process, a degassing process, and a heating process) of the scanning antenna, at the time of using a completed scanning antenna or the like. That is, when the environment is changed, moisture contained in the alignment film is vaporized, and the vaporized moisture (water vapor) is accumulated as air bubbles in the liquid crystal layer. In addition, in some cases, the moisture contained in the alignment film is vaporized at a time, such that the respective substrates between which the liquid crystal layer is interposed may be broken.

DISCLOSURE OF THE PRESENT INVENTION

An object of the present invention is to provide a scanning antenna having an appropriate alignment film material and a method of producing the scanning antenna.

Means for Solving the Problem

A scanning antenna according to the present invention is a scanning antenna in which antenna units are arranged, and includes: a thin film transistor (TFT) substrate that includes a first dielectric substrate, TFTs and patch electrodes supported by the first dielectric substrate, the patch electrodes being electrically connected to the TFTs, and a first alignment film disposed so as to cover the TFTs and the patch electrodes; a slot substrate that includes a second dielectric substrate, a slot electrode supported by the second dielectric substrate and including slots, and a second alignment film disposed so as to cover the slot electrode; a liquid crystal layer that is interposed between the TFT substrate and the slot substrate of which the first alignment film and the second alignment film face each other; and a reflective conductive plate that is disposed so as to face an opposite surface of the second dielectric substrate on which the slot electrode is not formed, with a dielectric layer interposed therebetween. The first alignment film and the second alignment film are acrylic alignment films containing an acrylic polymer.

In the scanning antenna, the acrylic alignment film may be a photoreactive acrylic alignment film that exhibits a function of aligning a liquid crystal compound in the liquid crystal layer in a specific direction when light is irradiated.

In the scanning antenna, the photoreactive acrylic alignment film may contain a photoreactive acrylic polymer containing a constitutional unit derived from an acrylic monomer having a photoreactive functional group at a side chain thereof.

In the scanning antenna, the liquid crystal compound in the liquid crystal layer may have at least one functional group selected from the group consisting of a F group, a Cl group, a Br group, a SCN group, a NCS group, a CN group, a OCN group, a NCO group, a $CF_3$ group, a $OCF_3$ group, and a $SF_5$ group at a terminal thereof.

In the scanning antenna, the liquid crystal compound in the liquid crystal layer may have at least one bond selected from the group consisting of a carbon-carbon triple bond, —CH=CH—, —CF=CF—, —CF=CH—, —CH=CF—, —(CO)O—, —O(CO)—, and —O—.

In the scanning antenna, the patch electrode and/or the slot electrode may be formed of copper.

The scanning antenna may further include a sealant that is interposed between the TFT substrate and the slot substrate so as to be adhered to each of the TFT substrate and the slot substrate while surrounding the liquid crystal layer. The sealant may have a liquid crystal injection port formed of a hole portion penetrating through a liquid crystal layer side and an outer side and used when the liquid crystal compound constituting the liquid crystal layer is injected between the TFT substrate and the slot substrate by a vacuum injection method, and have a sealing portion sealing the liquid crystal injection port.

A method of producing a scanning antenna according to the present invention is a method of producing any one of the scanning antennas as described above. The liquid crystal layer is formed by a vacuum injection method.

Advantageous Effect of the Invention

According to the present invention, it is possible to provide a scanning antenna having an appropriate alignment film material and a method of producing the scanning antenna.

MODE FOR CARRYING OUT THE INVENTION

First Embodiment (Basic Structure of Scanning Antenna)

A scanning antenna has a beam scanning function that can change a beam direction, and has a structure in which it includes antenna units that use a large anisotropy (birefringence) of a dielectric constant $M(\varepsilon_M)$ of a liquid crystal material. The scanning antenna controls a voltage applied to a liquid crystal layer of each antenna unit to change an effective dielectric constant $M(\varepsilon_M)$ of the liquid crystal layer of each antenna unit, thereby forming a two-dimensional pattern by the antenna units having different capacitances. Since the dielectric constant of the liquid crystal material has frequency dispersion, a dielectric constant in a frequency band of a microwave is particularly referred to as a "dielectric constant $M(\varepsilon_M)$" in the present description.

Electromagnetic waves (for example, microwaves) emitted from the scanning antenna or received by the scanning antenna are given a phase difference corresponding to a capacitance of each antenna unit to have a strong directivity in a specific direction depending on the two-dimensional pattern formed by the antenna units having the different capacitances (beam scanning). For example, the electromagnetic waves emitted from the scanning antenna are obtained by integrating spherical waves obtained by allowing input electromagnetic waves to be incident to each antenna unit and scattering the incident input electromagnetic waves by each antenna unit in consideration of the phase difference given by each antenna unit.

Figure 1:
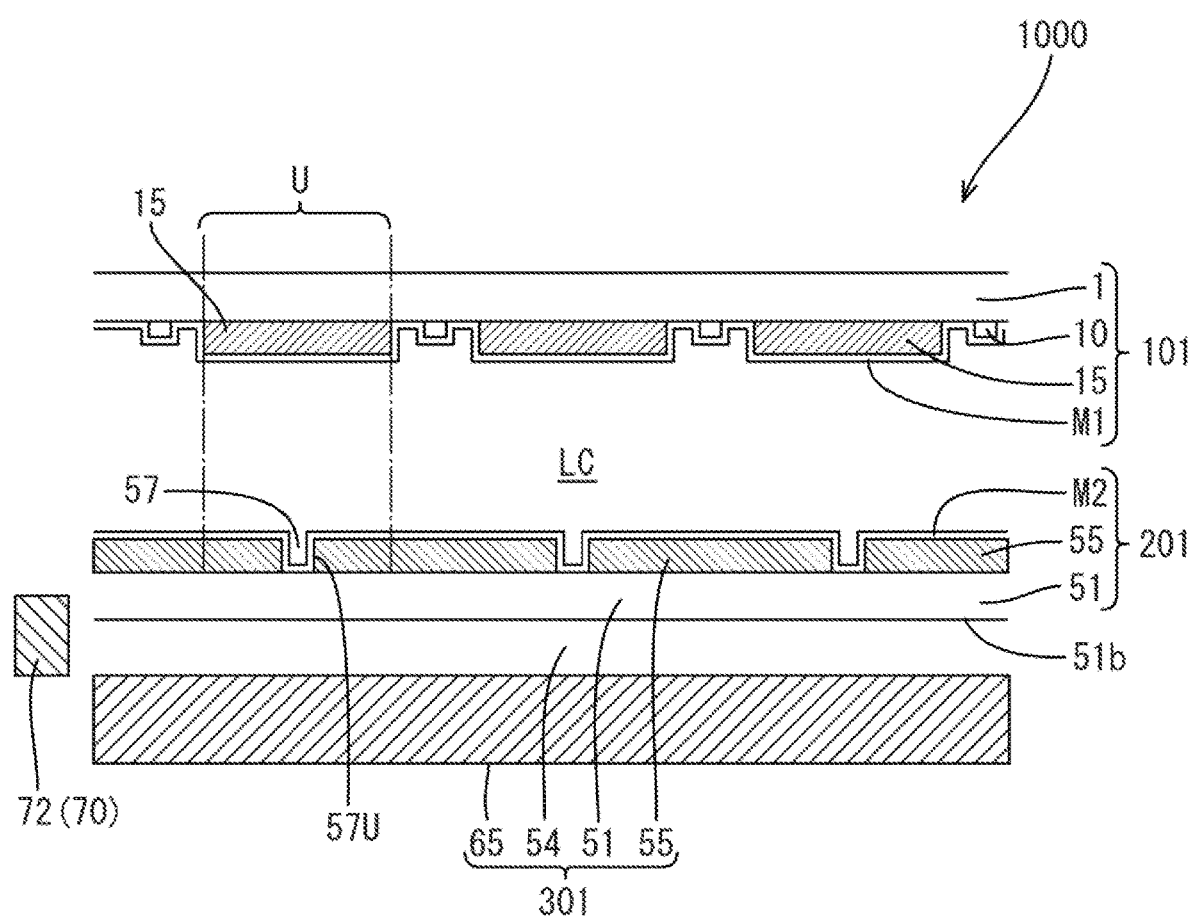
FIG. 1 is a cross-sectional view schematically showing a part of a scanning antenna according to a first embodiment.

Here, a basic structure of a scanning antenna according to a first embodiment of the present invention will be described with reference to FIG. 1 and the like. FIG. 1 is a cross-sectional view schematically showing a part of a scanning antenna 1000 according to a first embodiment. The scanning antenna 1000 according to the present embodiment is a radial inline slot antenna in which slots 57 are arranged in a concentric shape. In FIG. 1, a part of a cross section taken along a radial direction from a feeding pin 72 provided in the vicinity of the center of the slots arranged in the concentric shape is schematically shown. In another embodiment, an array of the slots may be various known arrays (for example, a spiral shape and a matrix shape).

The scanning antenna 1000 mainly includes a thin film transistor (TFT) substrate 101, a slot substrate 201, a liquid crystal layer LC disposed between the TFT substrate 101 and the slot substrate 201, and a reflective conductive plate 65. The scanning antenna 1000 is configured to transmit and receive microwaves to and from the TFT substrate 101. The TFT substrate 101 and the slot substrate 201 are disposed so as to face each other with the liquid crystal layer LC interposed therebetween.

The TFT substrate 101 includes a dielectric substrate (an example of a first dielectric substrate) 1 such as a glass substrate, patch electrodes 15 and thin film transistors (TFTs) 10 formed on a surface of the dielectric substrate 1 facing the liquid crystal layer LC, and an alignment film M1 formed on an outermost surface facing the liquid crystal layer LC. A gate bus line and a source bus line (not shown in FIG. 1) are connected to each TFT 10.

The slot substrate 201 includes a dielectric substrate (an example of a second dielectric substrate) 51 such as a glass substrate, a slot electrode 55 formed on a surface of the dielectric substrate 51 facing the liquid crystal layer LC, and an alignment film M2 formed on an outermost surface facing the liquid crystal layer LC. The slot electrode 55 has slots 57.

It is preferable that the dielectric substrates 1 and 51 each used in the TFT substrate 101 and the slot substrate 201 have a small dielectric loss against microwaves, and in addition to the glass substrate, a plastic substrate can be used as the dielectric substrates 1 and 51. A thickness of each of the dielectric substrates 1 and 51 is not particularly limited, and is, for example, preferably, 400 μm or less, more preferably, 300 μm or less. A lower limit of the thickness of each of the dielectric substrates 1 and 51 is not particularly limited, and may be any value as long as each of the dielectric substrates 1 and 51 has strength enough to withstand a producing process and the like.

The reflective conductive plate 65 is disposed so as to face the slot substrate 201 with an air layer 54 interposed therebetween. In another embodiment, a layer formed of a dielectric (for example, a fluororesin such as polytetrafluoroethylene (PTFE)) having a small dielectric constant M for microwaves may be used instead of the air layer 54. In the scanning antenna 1000 according to the present embodiment, the slot electrode 55, the reflective conductive plate 65, and the dielectric substrate 51 and the air layer 54 between the slot electrode 55 and the reflective conductive plate 65 function as a waveguide 301.

The patch electrode 15, a portion (hereinafter, referred to as a "slot electrode unit 57U") of the slot electrode 55 including the slot 57, and the liquid crystal layer LC between the patch electrode 15 and the slot electrode unit 57U constitute an antenna unit U. In each antenna unit U, one island-shaped patch electrode 15 faces one hole-shaped slot 57 (slot electrode unit 57U) with the liquid crystal layer LC interposed therebetween, such that a liquid crystal capacitance is configured. In the scanning antenna 1000 according to the present embodiment, antenna units U are arranged in a concentric shape. It should be noted that the antenna unit U includes an auxiliary capacitance electrically connected in parallel with the liquid crystal capacitance.

The slot electrode 55 constitutes the antenna unit U in each slot electrode unit 57U, and also functions as a wall of the waveguide 301. For this reason, the slot electrode 55 needs to have a function of suppressing transmission of the microwaves, and is formed of a relatively thick metal layer. Examples of such a metal layer can include a Cu layer, an Al layer and the like. For example, in order to reduce a microwave of 10 GHz up to 1/150, a thickness of the Cu layer is set to 3.3 μm or more, and a thickness of the Al layer is set to 4.0 μm or more. In addition, in order to reduce a microwave of 30 GHz up to 1/150, a thickness of the Cu layer is set to 1.9 μm or more, and a thickness of the Al layer is set to 2.3 μm or more. An upper limit of a thickness of the metal layer constituting the slot electrode 55 is not particularly limited, but it can be said that it preferable that the thickness of the metal layer be as small as possible in consideration of the formation of the alignment film M2 as described below. When the Cu layer is used as the metal layer, there is an advantage that the Cu layer can be made thinner than the Al layer. As a method of forming the slot electrode 55, other methods such as a thin film deposition method used in technology of a liquid crystal display device according to the related art or a method of attaching a metal foil (for example, a Cu foil or an Al foil) onto a substrate may be used. A thickness of the metal layer is set to, for example, from 2 μm or more to 30 μm or less. In addition, in a case of forming the metal layer by the thin film deposition method, the thickness of the metal layer is set to, for example, 5 μm or less. For example, an aluminum plate, a copper plate or the like having a thickness of several millimeters can be used as the reflective conductive plate 65.

Since the patch electrode 15 does not constitute the waveguide 301 unlike the slot electrode 55, the patch electrode 15 is formed of a metal layer having a thickness smaller than that of the slot electrode 55. It is preferable that a resistance of the patch electrode 15 be low in order to avoid loss that vibrations of free electrons in the patch electrode 15 are changed into heat when vibrations of free electrons in the vicinity of the slot 57 of the slot electrode 55 cause the vibrations of the free electrons in the patch electrode 15. In terms of mass productivity and the like, it is more preferable to use an Al layer than to use a Cu layer, and it is preferable that a thickness of the Al layer be, for example, from 0.5 μm or more to 2 μm or less.

An array pitch of the antenna units U is set to, for example, λ/4 or less and/or λ/5 or less in which λ is a wavelength of the microwave, as described in Patent Document 1. The wavelength λ is, for example, 25 mm, and the array pitch in this case is set to, for example, 6.25 mm or less and/or 5 mm or less.

The scanning antenna 1000 changes phases of microwaves excited (re-radiated) from each patch electrode 15 by changing a capacitance value of the liquid crystal capacitance of the antenna unit U. Therefore, as a liquid crystal material of the liquid crystal layer LC, it is preferable to use a liquid crystal material of which anisotropy ($\Delta \varepsilon_M$) of a dielectric constant M($\varepsilon_M$) for the microwave is large and tan $\delta_M$ (dielectric loss tangent for the microwave) is small. For example, a liquid crystal material of which $\Delta \varepsilon_M$ is 4 or more and tan $\delta_M$ is 0.02 or less (both of them are values of 19 GHz) as described in SID 2015 DIGEST pp. 824 to 826 written by M. Wittek et al can be appropriately used. In addition to this material, a liquid crystal material of which $\Delta \varepsilon_M$ is 0.4 or more and tan $\delta_M$ is 0.04 or less as described in Polymer 55 vol. August, pp. 599 to 602 (2006) written by Kuki can be used.

Although the dielectric constant of the liquid crystal material generally has frequency dispersion, the dielectric anisotropy $\Delta \varepsilon_M$ for the microwave has a positive correlation with refractive index anisotropy Δn for visible light. For this reason, it can be said that it is preferable that a liquid crystal material for the antenna unit for the microwave be a material having a large refractive index anisotropy Δn for the visible light. Here, when Δn (birefringence) for light of 550 nm is used as an index, a nematic liquid crystal of which Δn is 0.3 or more, preferably 0.4 or more is used for the antenna unit for the microwave. An upper limit of Δn is not particularly limited. A thickness of the liquid crystal layer LC is set to, for example, from 1 μm or more to 500 μm or less.

Figure 2:
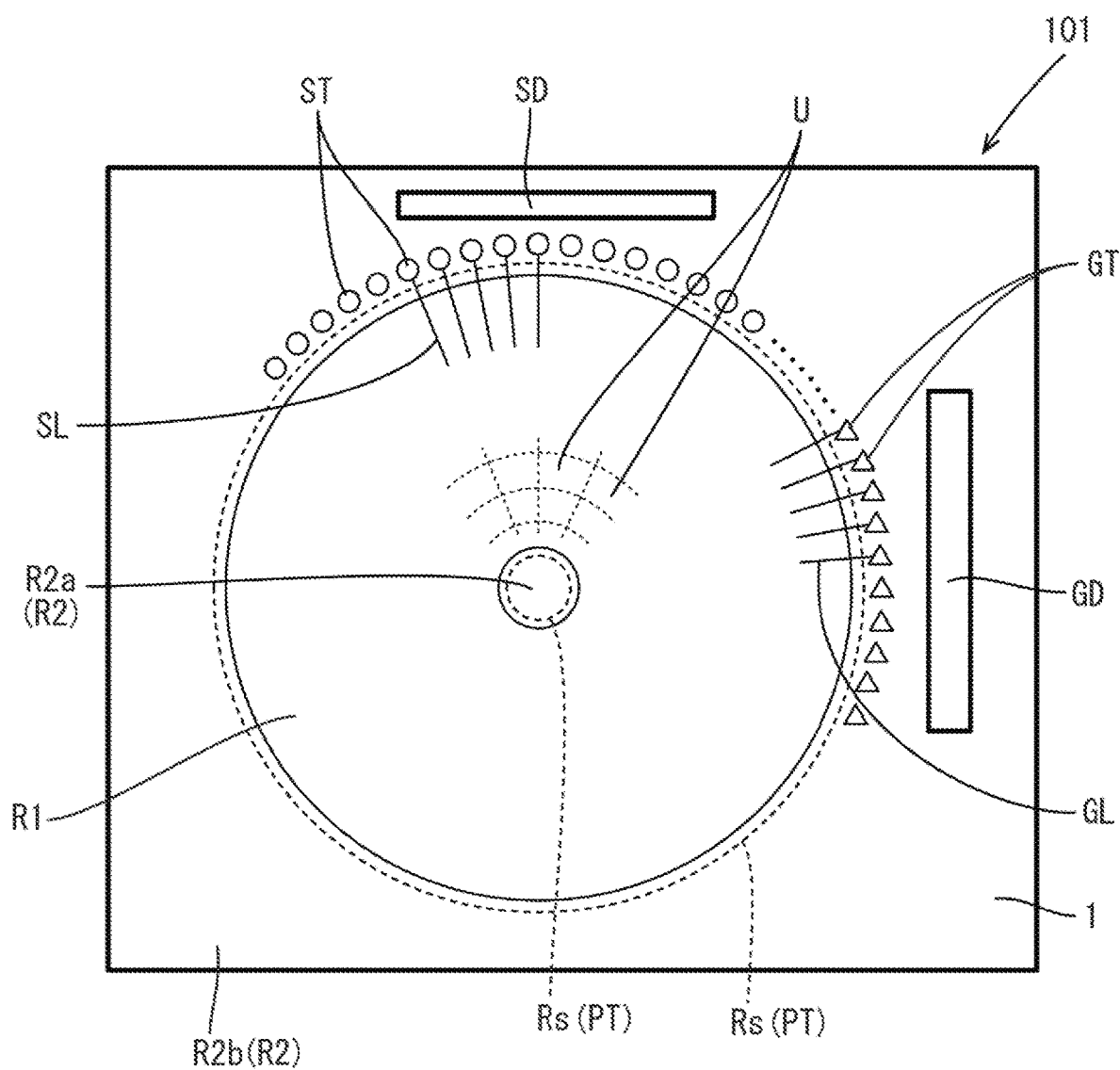
FIG. 2 is a plan view schematically showing a thin film transistor (TFT) substrate included in the scanning antenna.
Figure 3:
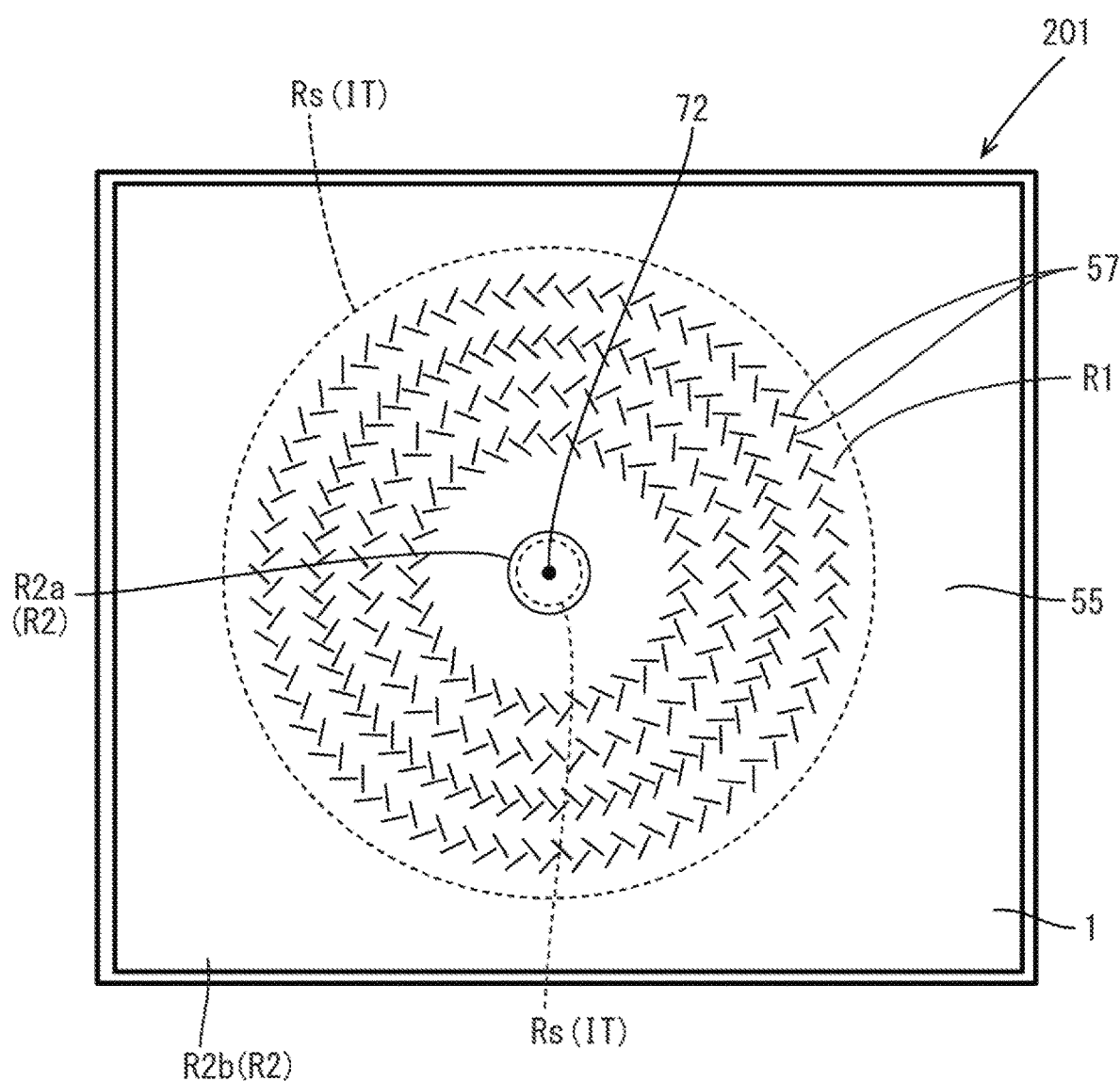
FIG. 3 is a plan view schematically showing a slot substrate included in the scanning antenna.

FIG. 2 is a plan view schematically showing the TFT substrate 101 included in the scanning antenna 1000, and FIG. 3 is a plan view schematically showing the slot substrate 201 included in the scanning antenna 1000. It should be noted that a region of the TFT substrate 101 and a region of the slot substrate 201 that correspond to the antenna unit U and are together referred to as an "antenna unit region" for convenience of explanation, and the same reference symbols as that of the antenna unit are used as reference symbols of the antenna unit region. As shown in FIGS. 2 and 3, in the TFT substrate 101 and the slot substrate 201, a region defined by antenna unit regions U that are two-dimensionally arranged is referred to as a "transmission/reception region R1", and a region other than the transmission/reception region R1 is referred to as a "non-transmission/reception region R2". In the non-transmission/reception region R2, a terminal portion, a drive circuit, and the like are arranged.

The transmission/reception region R1 has a ring shape when viewed in a plane. The non-transmission/reception region R2 includes a first non-transmission/reception region R2a positioned at a central portion of the transmission/reception region R1 and a second non-transmission/reception region R2b disposed at a circumference of the transmission/reception region R1. An outer diameter of the transmission/reception region R1 is, for example, from 200 mm or more to 1,500 mm or less, and is appropriately set depending on a communication amount or the like.

Gate bus lines GL and source bus lines SL supported by the dielectric substrate 1 are provided on the transmission/reception region R1 of the TFT substrate 101, and driving of each antenna unit region U is controlled by using these wirings. Each antenna unit region U includes the TFT 10 and the patch electrode 15 electrically connected to the TFT 10. A source electrode of the TFT 10 is electrically connected to a source bus line SL, and a gate electrode of the TFT 10 is electrically connected to a gate bus line GL. In addition, a drain electrode of the TFT 10 is electrically connected to the patch electrode 15.

In the non-transmission/reception region R2 (the first non-transmission/reception region R2a and the second non-transmission/reception region R2b), seal regions Rs in which a sealant (not shown) is formed so as to surround the transmission/reception region R1 are arranged. The sealant has a function of adhering the TFT substrate 101 and the slot substrate 201 to each other and sealing the liquid crystal material (liquid crystal layer LC) between the TFT substrate 101 and the slot substrate 201.

Gate terminal portions GT, a gate driver GD, source terminal portions ST, and a source driver SD are arranged outside the seal region Rs of the non-transmission/reception region R2. Each gate bus line GL is connected to the gate driver GD through the gate terminal portion GT, and each source bus line SL is connected to the source driver SD through the source terminal portion ST. It should be noted that both of the source driver SD and the gate driver GD are formed on the dielectric substrate 1 of the TFT substrate 101 in the present embodiment, but one or both of the source driver SD and the gate driver GD may also be formed on the dielectric substrate 51 of the slot substrate 201.

In addition, transfer terminal portions PT are provided in the non-transmission/reception region R2. The transfer terminal portions PT are electrically connected to the slot electrode 55 of the slot substrate 201. In the present embodiment, the transfer terminal portions PT are arranged in both of the first non-transmission/reception region R2a and the second non-transmission/reception region R2b. In another embodiment, the transfer terminal portions PT may be arranged in only any one of the first non-transmission/reception region R2a and the second non-transmission/reception region R2b. In addition, in the present embodiment, the transfer terminal portions PT are arranged in the seal regions Rs. For this reason, a conductive resin containing conductive particles (conductive beads) is used as the sealant.

As shown in FIG. 3, in the slot substrate 201, the slot electrode 55 is formed over the transmission/reception region R1 and the non-transmission/reception region R2 on the dielectric substrate 51. In FIG. 3, a surface of the slot substrate 201 viewed from the liquid crystal layer LC is shown, and for convenience of explanation, the alignment film M2 formed on the outermost surface is omitted.

In the transmission/reception region R1 of the slot substrate 201, slots 57 are arranged in the slot electrode 55. These slots 57 are assigned one by one to the antenna unit regions U of the TFT substrate 101, respectively. In the present embodiment, the slots 57 including a pair of slots 57 extending in directions substantially orthogonal to each other are arranged in a concentric shape so as to constitute the radial inline slot antenna. Since the scanning antenna 1000 has such a pair of slots 57, the scanning antenna 1000 can transmit and receive circularly polarized waves.

In the non-transmission/reception region R2 of the slot substrate 201, terminal portions IT of the slot electrode 55 are provided. The terminal portions IT are electrically connected to the transfer terminal portions PT of the TFT substrate 101. In the present embodiment, the terminal portions IT are arranged in the seal regions Rs, and are electrically connected to the corresponding transfer terminal portions PT by the sealant formed of the conductive resin containing the conductive particles (conductive beads), as described above.

In addition, in the first non-transmission/reception region R2a, the feeding pin 72 is provided so as to be disposed at the center of a concentric circle formed by the slots 57. The microwaves are supplied to the waveguide 301 constituted by the slot electrode 55, the reflective conductive plate 65, and the dielectric substrate 51 by the feeding pin 72. The feeding pin 72 is connected to a feeding device 70. A feeding manner may be any one of a direct-coupling feeding manner or an electromagnetic coupling feeding manner, and a known feeding structure can be adopted.

Hereinafter, the TFT substrate 101, the slot substrate 201, and the waveguide 301 will be described in detail.

<Structure of TFT Substrate 101>

Figure 4:
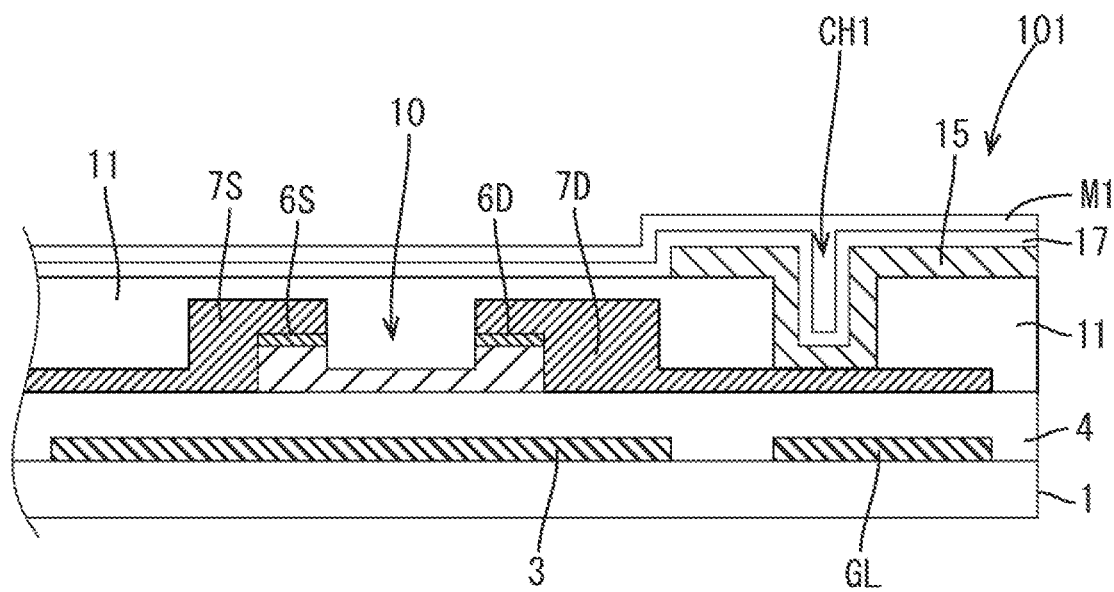
FIG. 4 is a cross-sectional view schematically showing an antenna unit region of the TFT substrate.
Figure 5:
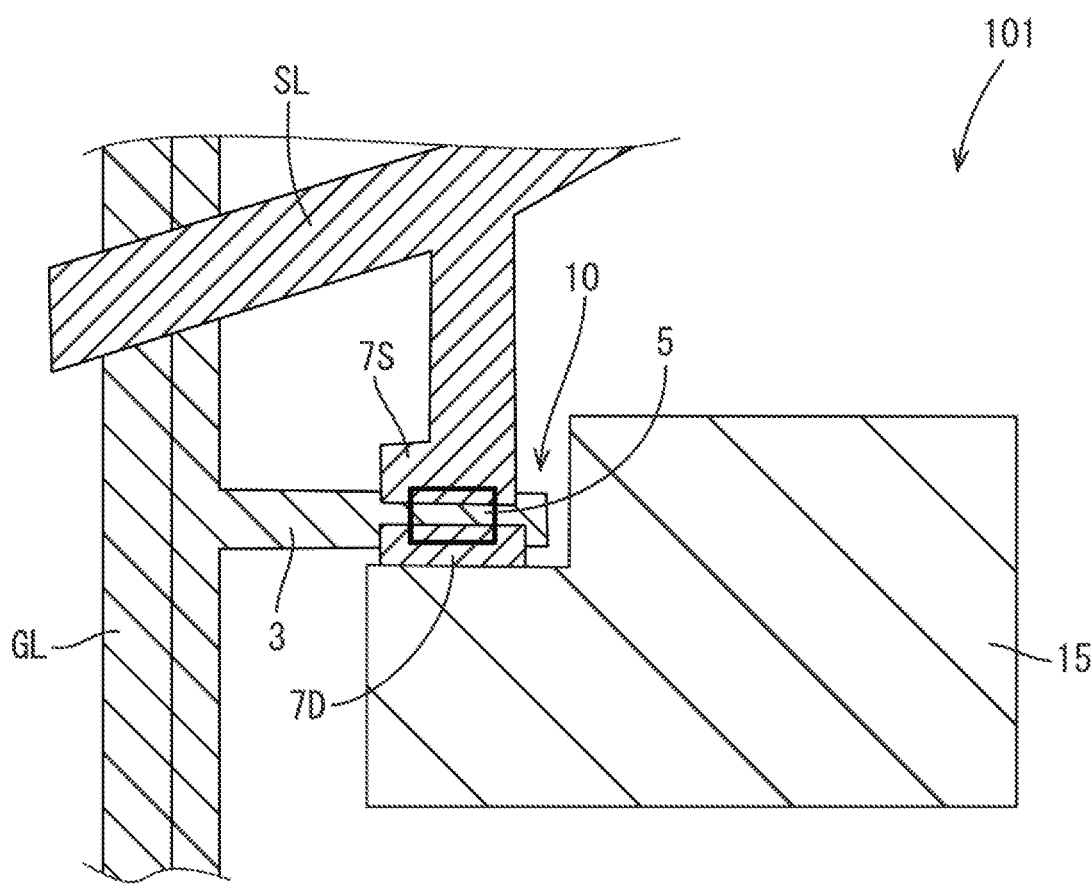
FIG. 5 is a plan view schematically showing the antenna unit region of the TFT substrate.

FIG. 4 is a cross-sectional view schematically showing the antenna unit region U of the TFT substrate 101, and FIG. 5 is a plan view schematically showing the antenna unit region U of the TFT substrate 101. In FIGS. 4 and 5, configurations of cross sections of a part of the transmission/reception region R1 are shown.

Each antenna unit region U of the TFT substrate 101 includes the dielectric substrate (first dielectric substrate) 1, the TFT 10 supported by the dielectric substrate 1, a first insulating layer 11 covering the TFT 10, the patch electrode 15 formed on the first insulating layer 11 and electrically connected to the TFT 10, a second insulating layer 17 covering the patch electrode 15, and the alignment film M1 covering the second insulating layer 17.

The TFT 10 includes agate electrode 3, a semiconductor layer 5 having an island shape, a gate insulating layer 4 disposed between the gate electrode 3 and the semiconductor layer 5, a source electrode 7S, and a drain electrode 7D. The TFT 10 according to the present embodiment is a channel etch type TFT having a bottom gate structure. It should be noted that TFTs having other structures may be used in another embodiment.

The gate electrode 3 is electrically connected to the gate bus line GL, and receives a scanning signal supplied from the gate bus line GL. The source electrode 7S is electrically connected to the source bus line SL, and receives a data signal supplied from the source bus line SL. The gate electrode 3 and the gate bus line GL may be formed of the same conductive film (gate conductive film). In addition, the source electrode 7S, the drain electrode 7D, and the source bus line SL may be formed of the same conductive film (source conductive film). The gate conductive film and the source conductive film are, for example, metal films. A layer formed using the gate conductive film may be referred to as a "gate metal layer", and a layer formed using the source conductive film may be referred to as a "source metal layer".

The semiconductor layer 5 is disposed so as to overlap the gate electrode 3 with the gate insulating layer 4 interposed therebetween. As shown in FIG. 4, a source contact layer 6S and a drain contact layer 6D are formed on the semiconductor layer 5. The source contact layer 6S and the drain contact layer 6D are disposed, respectively, at both sides of a region (channel region) in which a channel is formed in the semiconductor layer 5, so as to face each other. In the present embodiment, the semiconductor layer 5 is an intrinsic amorphous silicon (i-a-Si) layer, and the source contact layer 6S and the drain contact layer 6D are an $n^+$-type amorphous silicon ($n^+$-a-Si) layer. It should be noted that the semiconductor layer 5 may be a polysilicon layer, an oxide semiconductor layer or the like, in another embodiment.

The source electrode 7S is provided so as to be in contact with the source contact layer 6S, and is connected to the semiconductor layer 5 through the source contact layer 6S. The drain electrode 7D is provided so as to be in contact with the drain contact layer 6D, and is connected to the semiconductor layer 5 through the drain contact layer 6D.

The first insulating layer 11 has a contact hole CH1 reaching the drain electrode 7D of the TFT 10.

The patch electrode 15 is provided on the first insulating layer 11 and in the contact hole CH1, and is in contact with the drain electrode 7D in the contact hole CH1. The patch electrode 15 is mainly formed of a metal layer. It should be noted that the patch electrode 15 may be a metal electrode formed of only a metal layer. A material of the patch electrode 15 may be the same as that of the source electrode 7S and the drain electrode 7D. A thickness of the metal layer in the patch electrode 15 (a thickness of the patch electrode 15 in a case where the patch electrode 15 is the metal electrode) may be the same as that of the source electrode 7S and the drain electrode 7D, but is preferably larger than that of the source electrode 7S and the drain electrode 7D. When the thickness of the patch electrode 15 is large, transmittance of the electromagnetic wave is suppressed to be low, such that a sheet resistance of the patch electrode is reduced, and loss that vibrations of free electrons in the patch electrode are changed to heat is reduced.

In addition, a CS bus line CL may be provided using the same conductive film as that of the gate bus line GL. The CS bus line CL may be disposed so as to overlap with the drain electrode 7D (or an extending portion of the drain electrode 7D) with the gate insulating layer 4 interposed therebetween to constitute an auxiliary capacitance CS having the gate insulating layer 4 as a dielectric layer.

In the present embodiment, the patch electrode 15 is formed in a layer different from the source metal layer. For this reason, a thickness of the source metal layer and a thickness of the patch electrode 15 can be controlled independently of each other.

The patch electrode 15 may include a Cu layer or an Al layer as a main layer. Performance of the scanning antenna is correlated with an electric resistance of the patch electrode 15, such that a thickness of the main layer of the patch electrode 15 is set so as to obtain a desired resistance. It is preferable that the patch electrode 15 have a resistance low enough not to hinder vibrations of electrons. The thickness of the metal layer in the patch electrode 15 is set to, for example, 0.5 μm or more when the metal layer is an Al layer.

The alignment film M1 is formed of an acrylic resin. Details of the alignment film M1 will be described below.

The TFT substrate 101 is produced by, for example, a method to be described below. First, the dielectric substrate 1 is prepared. For example, a glass substrate, a plastic substrate having heat resistance, or the like can be used as the dielectric substrate 1. The gate metal layer including the gate electrode 3 and the gate bus line GL is formed on such a dielectric substrate 1.

The gate electrode 3 can be formed integrally with the gate bus line GL. Here, the gate conductive film (of which a thickness is, for example, from 50 nm or more to 500 nm or less) is formed on the dielectric substrate 1 by a sputtering method or the like. Then, the gate electrode 3 and the gate bus line GL are formed by patterning the gate conductive film. A material of the gate conductive film is not particularly limited, and can be a metal such as aluminum (Al), tungsten (W), molybdenum (Mo), tantalum (Ta), chromium (Cr), titanium (Ti), or copper (Cu), or alloys or nitrides thereof. Here, a laminated film in which MoN (of which a thickness is, for example, 50 nm), Al (of which a thickness is, for example, 200 nm) and MoN (of which a thickness is, for example, 50 nm) are sequentially laminated is formed as the gate conductive film.

Then, the gate insulating layer 4 is formed so as to cover the gate metal layer. The gate insulating layer 4 can be formed by a chemical vapor deposition (CVD) method or the like. A silicon oxide ($SiO_2$) layer, a silicon nitride (SiNx) layer, a silicon oxynitride (SiOxNy; x>y) layer, a silicon nitride oxide (SiNxOy; x>y) layer or the like may be appropriately used as the gate insulating layer 4. The gate insulating layer 4 may have a laminated structure. Here, a SiNx layer (of which a thickness is, for example, 410 nm) is formed as the gate insulating layer 4.

Then, the semiconductor layer 5 and a contact layer are formed on the gate insulating layer 4. Here, the semiconductor layer 5 having the island and the contact layer are obtained by sequentially forming and patterning an intrinsic amorphous silicon film (of which a thickness is, for example, 125 nm) and an $n^+$-type amorphous silicon film (of which a thickness is, for example, 65 nm). It should be noted that a semiconductor film used in the semiconductor layer 5 is not limited to the amorphous silicon film. For example, an oxide semiconductor layer may be formed as the semiconductor layer 5. In this case, a contact layer may not be provided between the semiconductor layer 5 and the source and drain electrodes.

Then, the source metal layer including the source electrode 7S, the drain electrode 7D, and the source bus line SL is formed by forming the source conductive film (of which a thickness is, for example, from 50 nm or more to 500 nm or less) on the gate insulating layer 4 and the contact layer and patterning the source conductive film. In this case, the contact layer is also etched, such that the source contact layer 6S and the drain contact layer 6D separated from each other are formed.

A material of the source conductive film is not particularly limited, and can be a metal such as aluminum (Al), tungsten (W), molybdenum (Mo), tantalum (Ta), chromium (Cr), titanium (Ti), or copper (Cu), or alloys or nitrides thereof. Here, a laminated film in which MoN (of which a thickness is, for example, 30 nm), Al (of which a thickness is, for example, 200 nm) and MoN (of which a thickness is, for example, 50 nm) are sequentially laminated is formed as the source conductive film.

Here, the source conductive film is formed by, for example, a sputtering method, and patterning (source/drain separation) of the source conductive film is performed by wet etching. Then, a portion of the contact layer positioned on a region that becomes the channel region of the semiconductor layer 5 is removed by, for example, dry etching to form a gap portion, thereby separating the contact layer into the source contact layer 6S and the drain contact layer 6D. In this case, in the gap portion, the vicinity of a surface of the semiconductor layer 5 is also etched (overetching).

Then, the first insulating layer 11 is formed so as to cover the TFT 10. In this example, the first insulating layer 11 is disposed so as to be in contact with the channel region of the semiconductor layer 5. In addition, the contact hole CH1 reaching the drain electrode 7D is formed in the first insulating layer 11 by a known photolithography technology.

The first insulating layer 11 may be an inorganic insulating layer such as a silicon oxide ($SiO_2$) film, a silicon nitride (SiNx) film, a silicon oxynitride (SiOxNy; x>y) film, or a silicon nitride oxide (SiNxOy; x>y) film. Here, a SiNx layer having a thickness of, for example, 330 nm is formed as the first insulating layer 11 by, for example, a CVD method.

Then, a patch conductive film is formed on the first insulating layer 11 and in the contact hole CH1, and is patterned. As a result, the patch electrode 15 is formed in the transmission/reception region R1. It should be noted that a patch connection portion formed of the same conductive film (conductive film for patch) as that of the patch electrode 15 is formed in the non-transmission/reception region R2. The patch electrode 15 is in contact with the drain electrode 7D within the contact hole CH1.

The same material as that of the gate conductive film or the source conductive film can be used as a material of the patch conductive film. However, it is preferable that the patch conductive film be set to be thicker than the gate conductive film and the source conductive film. An appropriate thickness of the patch conductive film is, for example, from 1 μm or more to 30 μm or less. When the thickness of the patch conductive film is smaller than 1 μm, transmittance of the electromagnetic wave becomes about 30%, and a sheet resistance becomes 0.03 Ω/sq or more, such that it is likely that loss will be increased, and the thickness of the patch conductive film is larger than 30 μm, it is likely that patterning characteristics of the slot 57 will be deteriorated.

Here, a laminated film (MoN/Al/MoN) in which MoN (of which a thickness is, for example, 50 nm), Al (of which a thickness is, for example, 1000 nm) and MoN (of which a thickness is, for example, 50 nm) are sequentially laminated is formed as the patch conductive film.

Then, the second insulating layer (of which a thickness is, for example, from 100 nm or more to 300 nm or less) 17 is formed on the patch electrode 15 and the first insulating layer 11. The second insulating layer 17 is not particularly limited, and can be, for example, a silicon oxide ($SiO_2$) film, a silicon nitride (SiNx) film, a silicon oxynitride (SiOxNy; x>y) film, a silicon nitride oxide (SiNxOy; x>y) film or the like. Here, for example, a SiNx layer having a thickness of 200 nm is formed as the second insulating layer 17.

Then, an inorganic insulating film (the second insulating layer 17, the first insulating layer 11, and the gate insulating layer 4) are collectively etched by, for example, dry etching using a fluorine-based gas. In the etching, the patch electrode 15, the source bus line SL, and the gate bus line GL function as an etch stop. Therefore, a second contact hole reaching the gate bus line GL is formed in the second insulating layer 17, the first insulating layer 11, and the gate insulating layer 4, and a third contact hole reaching the source bus line SL is formed in the second insulating layer 17 and the first insulating layer 11. In addition, a fourth contact hole reaching the patch connection portion described above is formed in the second insulating layer 17.

Then, a conductive film (of which a thickness is from 50 nm or more to 200 nm or less) is formed on the second insulating layer 17 and in the second contact hole, the third contact hole, and the fourth contact hole by, for example, a sputtering method. A transparent conductive film such as an indium tin oxide (ITO) film, an IZO film, or a ZnO film (zinc oxide film) can be used as the conductive film. Here, for example, an ITO film having a thickness of 100 nm is used as the conductive film.

Then, an upper connection portion for a gate terminal, an upper connection portion for a source terminal, and an upper connection portion for a transfer terminal are formed by patterning the transparent conductive film. The upper connection portion for a gate terminal, the upper connection portion for a source terminal, and the upper connection portion for a transfer terminal are used in order to protect the electrodes or wirings exposed at each terminal portion. In this way, the gate terminal portion GT, the source terminal portion ST, and the transfer terminal portion PT are obtained.

Then, the alignment film M1 is formed so as to cover the second insulating layer 17 and the like. Details of the alignment film M1 will be described below. In this way, the TFT substrate 101 can be produced.

<Structure of Slot Substrate 201>

Figure 6:
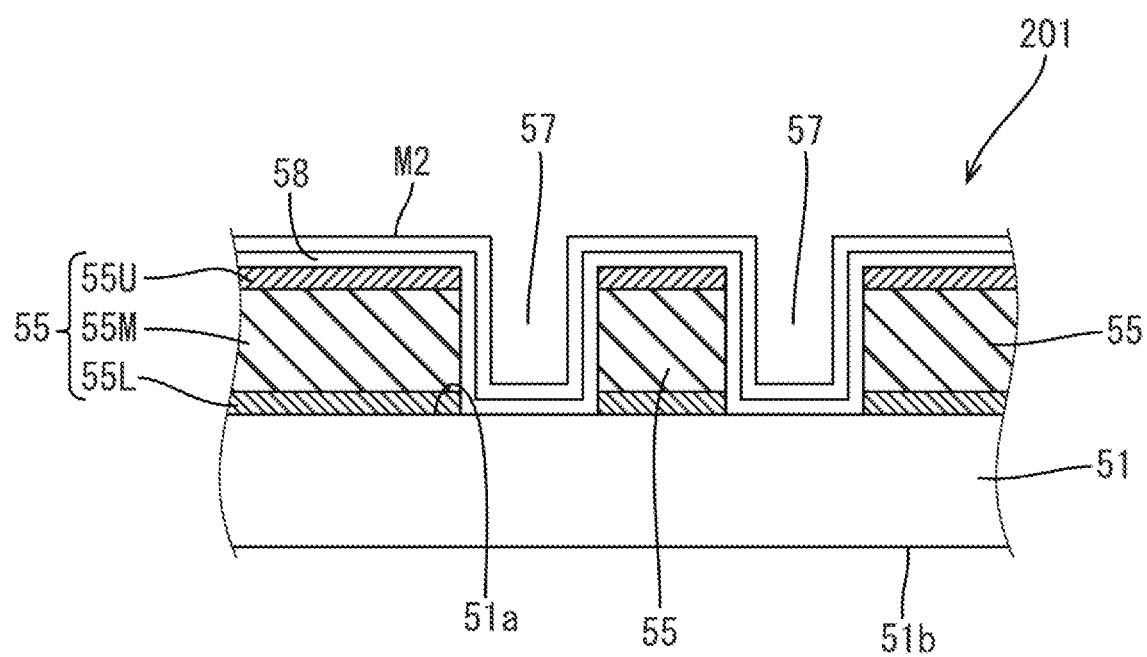
FIG. 6 is a cross-sectional view schematically showing an antenna unit region of the slot substrate.

Next, a structure of the slot substrate 201 will be described in more detail. FIG. 6 is a cross-sectional view schematically showing the antenna unit region U of the slot substrate 201.

The slot substrate 201 mainly includes the dielectric substrate (second dielectric substrate) 51, the slot electrode 55 formed on one plate surface (a plate surface facing the liquid crystal layer or a plate surface facing the TFT substrate 101) 51a of the dielectric substrate 51, a third insulating layer 58 covering the slot electrode 55, and the alignment film M2 covering the third insulating layer 58.

In the transmission/reception region R1 of the slot substrate 201, the slots 57 are formed in the slot electrode 55 (see FIG. 3). The slot 57 is an opening (groove) penetrating through the slot electrode 55. In this example, one slot 57 is assigned to each antenna unit region U.

The slot electrode 55 includes a main layer 55M such as a Cu layer or an Al layer. The slot electrode 55 may have a laminated structure in which it includes the main layer 55M and an upper layer 55U and a lower layer 55L disposed with the main layer 55M interposed therebetween. A thickness of the main layer 55M may be set in consideration of a skin effect depending on a material, and may be, for example, from 2 μm or more to 30 μm or less. The thickness of the main layer 55M is typically set to be larger than those of the upper layer 55U and the lower layer 55L.

In this example, the main layer 55M is a Cu layer, and the upper layer 55U and the lower layer 55L are Ti layers. Adhesion between the slot electrode 55 and the dielectric substrate 51 can be improved by disposing the lower layer 55L between the main layer 55M and the dielectric substrate 51. In addition, corrosion of the main layer 55M (for example, the Cu layer) can be suppressed by providing the upper layer 55U.

The third insulating layer 58 is formed on the slot electrode 55 and in the slot 57. A material of the third insulating layer 52 is not particularly limited, and can be, for example, a silicon oxide ($SiO_2$) film, a silicon nitride (SiNx) film, a silicon oxynitride (SiOxNy; x>y) film, or a silicon nitride oxide (SiNxOy; x>y) film, or the like.

The alignment film M2 is formed of an acrylic resin, similar to the alignment film M1 of the TFT substrate 101. Details of the alignment film M2 will be described below.

It should be noted that the terminal portions IT are provided in the non-transmission/reception region R2 of the slot substrate 201 (see FIG. 3). The terminal portion IT includes a part of the slot electrode 55, the third insulating layer 58 covering a part of the slot electrode 55, and an upper connection portion. The third insulating layer 58 has an opening (contact hole) reaching a part of the slot electrode 55. The upper connection portion is in contact with a part of the slot electrode 55 in the opening. In the present embodiment, the terminal portion IT is formed of a conductive layer such as an ITO film or an IZO film, is disposed in the seal region Rs, and is connected to the transfer terminal portion PT in the TFT substrate 101 by a seal resin containing conductive particles (for example, conductive beads such as Au beads).

The slot substrate 201 is produced by, for example, a method to be described below. First, the dielectric substrate 51 is prepared. A substrate having a high transmittance (a small dielectric constant εM and a small dielectric loss tan δM) for the electromagnetic wave, such as a glass substrate or a resin substrate can be used as the dielectric substrate 51. It is preferable that the dielectric substrate 51 be as thin as possible in order to suppress attenuation of the electromagnetic wave. For example, after components such as the slot electrode 55 are formed on a surface of the glass substrate by a process to be described below, the glass substrate may be thinned from a back surface side thereof. As a result, a thickness of the glass substrate can be set to, for example, 500 μm or less. In general, a resin has a smaller dielectric constant εM and dielectric loss tan δM than those of a glass. When the dielectric substrate 51 is the resin substrate, a thickness of the dielectric substrate 51 is, for example, from 3 μm or more to 300 μm or less. Polyimide or the like is used as a material of the resin substrate.

The slot electrode 55 having the slots 57 is obtained by forming a metal film on the dielectric substrate 51 and patterning the metal film. A Cu film (or an Al film) having a thickness of from 2 μm or more to 5 μm or less may be used as the metal film. Here, a laminated film in which a Ti film, a Cu film, and a Ti film are sequentially laminated is used.

Then, the third insulating layer (of which a thickness is, for example, from 100 nm or more to 200 nm or less) 58 is formed on the slot electrode 55 and in the slot 57. Here, the third insulating layer 52 is formed of a silicon oxide ($SiO_2$) film.

Then, in the non-transmission/reception region R2, the opening (contact hole) reaching a part of the slot electrode 55 is formed in the third insulating layer 58.

Then, a transparent conductive film is formed on the third insulating layer 58 and in the opening of the third insulating layer 58 and is patterned, such that an upper connection portion in contact with a part of the slot electrode 55 is formed in the opening, and a terminal portion IT for being connected to the transfer terminal portion PT of the TFT substrate 101 is obtained.

Then, the alignment film M2 is formed so as to cover the third insulating layer 58. Details of the alignment film M2 will be described below. In this way, the slot substrate 201 can be produced.

<Configuration of Waveguide 301>

The waveguide 301 is configured such that the reflective conductive plate 65 faces the slot electrode 55 with the dielectric substrate 51 interposed therebetween. The reflective conductive plate 65 is disposed so as to face a back surface of the dielectric substrate 51 with the air layer 54 interposed therebetween. Since the reflective conductive plate 65 constitutes the wall of the waveguide 301, it is preferable that the reflective conductive plate 65 have a thickness at least three times or more, preferably, at least five times or more the skin depth. For example, an aluminum plate, a copper plate or the like produced by cutting and having a thickness of several millimeters can be used as the reflective conductive plate 65.

For example, when the scanning antenna 1000 performs transmission, the waveguide 301 guides the microwaves supplied from the feeding pin 72 disposed at the center of the antenna units U arranged in the concentric shape so as to radially spread outward. When the microwaves move along the waveguide 301, the microwaves are cut off at each slot 57 of each antenna unit U, such that an electric field is generated by a principle of a so-called slot antenna, and electric charges are induced in the slot electrode 55 by an action of the electric field (that is, the microwaves are converted into vibrations of free electrons in the slot electrode 55). In each antenna unit U, a phase of vibrations of free electrons induced in the patch electrode 15 is controlled by changing a capacitance value of a liquid crystal capacitance through alignment control of a liquid crystal. When the electric charges are induced in the patch electrode 15, the electric field is generated (that is, the vibrations of the free electrons in the slot electrode 55 move to the vibrations of the free electrons in the patch electrode 15), and microwaves (radio waves) oscillate from the patch electrode 15 of each antenna unit U toward an outer side of the TFT substrate 101. An azimuth angle of a beam is controlled by adding together the microwaves (radio waves) oscillating from each antenna unit U and having different phases.

In another embodiment, the waveguide may have a two-layer structure in which it is divided into an upper layer and a lower layer. In this case, the microwaves supplied from the feeding pin first move in the lower layer so as to radially spread from the center of the lower layer toward an outer side of the lower layer, ascend to the upper layer at an outer wall portion of the lower layer, and then move in the upper layer so as to gather from an outer side of the upper layer to the center of the upper layer. By adopting such a two-layer structure, it becomes easy to uniformly spread the microwaves over each antenna unit U.

<Alignment Films M1 and M2>

The alignment films M1 and M2 (hereinafter, collectively referred to as an "alignment film M") used in the TFT substrate 101 and the slot substrate 201 according to the present embodiment, respectively, are polymer films (acrylic alignment film) formed of an acrylic resin (acrylic polymer).

The alignment film M mainly formed of the acrylic polymer has hygroscopicity much lower than that of, for example, a polyimide based (polyamic acid-based) alignment film. For this reason, the alignment film M mainly formed of the acrylic polymer is appropriate as an alignment film of a substrate having a large step structure (concave-convex structure) such as each substrate (the TFT substrate 101 and the slot substrate 201) of the scanning antenna.

The acrylic polymer used in the alignment film M is a polymer of a monomer composition containing alkyl (meth) acrylate having an alkyl group (hereinafter, simply referred to as "alkyl (meth)acrylate") and/or (meth)acrylate having a photoreactive functional group (hereinafter, simply referred to as "photoreactive (meth)acrylate"). In the present description of the present application, "(meth)acryl" refers to "acryl" and/or "methacryl" (any one or both of "acryl" and/or "methacryl").

For example, a compound represented by Chemical Formula (1) can be appropriately used as the alkyl (meth) acrylate.

[Chemical Formula 1]

In Chemical Formula (1), $R^1$ is a hydrogen atom or a methyl group. In addition, $R^2$ is a linear or branched chain alkyl group having 1 to 18 carbon atoms. It should be noted that $R^2$ is preferably a linear or branched chain alkyl group having 1 to 10 carbon atoms, and more preferably, a linear or branched chain alkyl group having 1 to 8 carbon atoms.

Specific examples of the alkyl (meth)acrylate can include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate (lauryl (meth)acrylate), tridecyl (meth)acrylate, tetradecyl (meth)acrylate, pentadecyl (meth)acrylate, hexadecyl (meth)acrylate, heptadecyl (meth)acrylate, octadecyl (meth)acrylate (stearyl (meth)acrylate), isostearyl (meth)acrylate, and the like. These may be used singly or in combination of two or more thereof.

In addition, for example, a compound represented by Chemical Formula (2) can be appropriately used as the photoreactive (meth)acrylate.

[Chemical Formula 2]

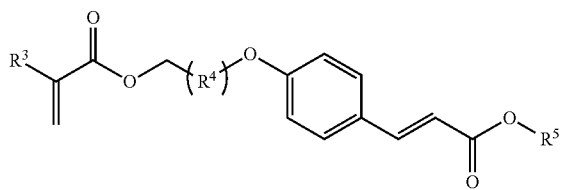

In Chemical Formula (2), $R^3$ is a hydrogen atom or a methyl group. In addition, $R^4$ is a spacer portion and is a single bond or a divalent organic group. $R^4$ is a not indispensable, and may be omitted. $R^5$ is a modifying group, and is a monovalent organic group or a hydrogen atom. It should be noted that $R^4$ is preferably an alkyl group having 1 to 12 carbon atoms, and $R^5$ is preferably any one of a hydrogen atom, an alkyl group having 1 to 6 carbon atoms, and a phenyl group. The photoreactive (meth)acrylate reacts to a predetermined light such as ultraviolet rays when it receives the predetermined light, such that a structure of the photoreactive (meth)acrylate is changed.

In a case where the acrylic polymer contains a constitutional unit derived from the photoreactive (meth)acrylate represented by Chemical Formula (2) or the like, the alignment film M formed of the acrylic polymer can be used as a photo-alignment film (acrylic photo-alignment film). Such a photo-alignment film (acrylic alignment film) exhibits a function of aligning a liquid crystal compound in the liquid crystal layer LC in a specific direction when a predetermined light (for example, linearly polarized ultraviolet ray) is irradiated (photo-alignment processing) from the specific direction. As described above, the photo-alignment film (acrylic alignment film) may contain a photoreactive acrylic polymer containing a constitutional unit derived from an acrylic monomer having a photoreactive functional group at a side chain thereof.

The acrylic polymer may contain a constitutional unit derived from another monomer, in addition to the constitutional unit derived from the abovementioned monomer (alkyl (meth)acrylate or photoreactive (meth)acrylate).

Examples of another monomer can include (meth)acrylate containing a non-photoreactive vertical side chain in order to control a tilt angle of the liquid crystal compound, (meth)acrylate containing a non-photoreactive thermal cross-linking side chain in order to improve reliability, or the like.

The acrylic polymer is prepared by polymerizing the monomer composition by a known or conventional polymerization method. Examples of the polymerization method of the acrylic polymer can include a solution polymerization method, an emulsion polymerization method, a bulk polymerization method, a polymerization method by ultraviolet irradiation, or the like. At the time of polymerization of the acrylic polymer, appropriate components corresponding to the respective polymerization methods such as a polymerization initiator, a chain transfer agent, an emulsifier, a solvent and the like are appropriately selected and used among known or conventional components.

A weight average molecular weight of the acrylic polymer is not particularly limited as long as an object of the present invention is not impaired. A solvent for dissolving the acrylic polymer is not particularly limited as long as the object of the present invention is not impaired.

Examples of an appropriate acrylic polymer used in the alignment film M can include polymethylmethacrylate (PMMA) and the like.

In addition, the alignment film M may contain other resin components, in addition to the acrylic polymer, as long as the object of the present invention is not impaired.

A method of forming the alignment film M containing the polyacrylic polymer is not particularly limited, and can be a known method of forming a film. For example, an alignment film solution obtained by dissolving the acrylic polymer in a predetermined solvent is coated onto a surface of the TFT substrate 101 or the like, which is a target to be applied, using a known coating method (for example, a spin coater). The coated film after being coated is appropriately heated in order to remove the solvent. Alignment processing is appropriately performed on the coated film (alignment film) after being heated.

As the alignment processing for the alignment film M, rubbing processing may be performed, or photo-alignment processing for irradiating light (for example, linearly polarized ultraviolet ray) from a predetermined direction may be performed in a case where the alignment film M is the photo-alignment film.

A thickness of the alignment film M is not particularly limited, and is appropriately set as needed.

Figure 7:
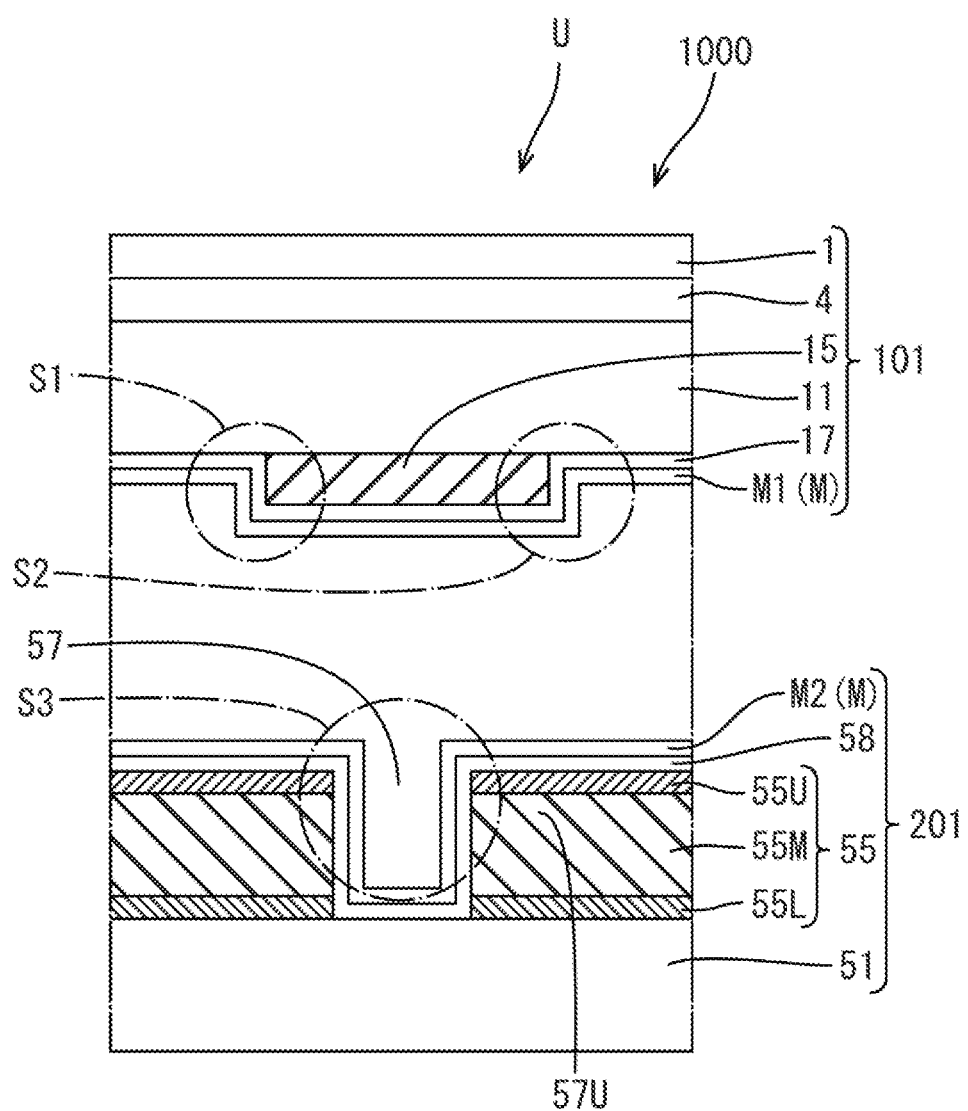
FIG. 7 is a cross-sectional view schematically showing a TFT substrate, a liquid crystal layer, and a slot substrate constituting an antenna unit of a scanning antenna.

Here, a portion in which it is easy for a thickness of the alignment film M to become large will be described with reference to FIG. 7. FIG. 7 is a cross-sectional view schematically showing the TFT substrate 101, the liquid crystal layer LC, and the slot substrate 201 constituting the antenna unit U of the scanning antenna 1000. As shown in FIG. 7, in the antenna unit U, the island-shaped patch electrode 15 of the TFT substrate 101, the hole-shaped (groove-shaped) slot 57 (slot electrode unit 57U) included in the slot electrode 55 of the slot substrate 201 face each other with the liquid crystal layer LC interposed therebetween. In the present description, the antenna unit U has a structure in which it includes one patch electrode 15 and the slot electrode 55

(slot electrode unit 57U) in which at least one slot 57 corresponding to the patch electrode 15 is disposed.

On a surface of the TFT substrate 101 facing the liquid crystal layer LC, the patch electrode 15 is in a state where it highly protrudes from a surface of the first insulating layer 11 in a convex shape. In addition, a space between adjacent patch electrodes 15 is in a state where it is deeply recessed in a concave shape. As described above, a large step structure (concave-convex structure) mainly derived from the patch electrode 15 is formed on the surface of the TFT substrate 101 facing the liquid crystal layer LC.

In addition, on a surface of the slot substrate 201 facing the liquid crystal layer LC, the slot 57 formed in the slot electrode 55 is in a state where it is deeply recessed toward the dielectric substrate 51. It can be said that portions of the slot electrode 55 surrounding the slot 57 are in a state where they highly protrude from a surface of the dielectric substrate 51. As described above, a large step structure (concave-convex structure) mainly derived from the slot electrode 55 (slot 57) is formed on the surface of the slot substrate 201 facing the liquid crystal layer LC.

In the TFT substrate 101 having the large step structure (concave-convex structure) described above, it is easy for the alignment film M1 to be accumulated in a producing process and it is easy for the thickness of the alignment film M1 to become large, in the vicinity of peripheral portions (portions indicated by reference symbols S1 and S2 in FIG. 7) in which the patch electrode 15 protrudes in the convex shape. In addition, in the slot substrate 201, it is easy for the alignment film M2 to be accumulated in the producing process and it is easy for a thickness of the alignment film M2 to become large, in a portion (portion denoted by reference symbol S3 in FIG. 7) in the slot 57 recessed in the concave shape.

However, in the present embodiment, since the polymer film mainly formed of the acrylic polymer is used as the alignment film M (M1 and M2), even though the thickness of the alignment film M (M1 and M2) becomes partially large as described above, the hygroscopicity of the alignment film M (M1 and M2) is very low, and air bubbles are thus suppressed to be accumulated in the liquid crystal layer LC.

<Liquid Crystal Layer LC>

It is preferable to use a liquid crystal material having a large polarity as a liquid crystal material (liquid crystal compound) constituting the liquid crystal layer LC according to the present embodiment. For example, it is preferable that the liquid crystal compound have at least one functional group selected from the group consisting of halogen groups (a F group, a Cl group, or a Br group), a SCN group, a NCS group, a CN group, a OCN group, a NCO group, a $CF_3$ group, a $OCF_3$ group, and a $SF_5$ group, at a terminal thereof. In addition, it is preferable that the liquid crystal compound have at least one bond selected from the group consisting of a carbon-carbon triple bond (acetylene bond), —CH=CH—, —CF=CF—, —CF=CH—, —CH=CF—, —(CO)O—, —O(CO)—, and —O—. When such a bond is included, a polarity becomes larger, which is preferable.

The liquid crystal compound as described above has a large anisotropy of a dielectric constant in a microwave range, and can be said to be particularly preferable as a liquid crystal compound for an antenna. Further, the liquid crystal compound has a polarity larger than that of a liquid crystal compound used in a liquid crystal display panel according to the related art, and can thus be said that solubility of water is high. Therefore, even when moisture is generated from the alignment film M (the alignment film M1 and the alignment film M2), it is possible to dissolve the moisture in the liquid crystal layer LC, such that it is possible to prevent generation of the air bubbles.

(Method of Producing Scanning Antenna)

At the time of producing the scanning antenna, a process of filling the liquid crystal layer LC between the TFT substrate 101 and the slot substrate 201 is performed. The liquid crystal material (liquid crystal compound) constituting the liquid crystal layer LC may be filled between the TFT substrate 101 and the slot substrate 201 by a one drop fill (ODF) method or may be filled between the TFT substrate 101 and the slot substrate 201 by a vacuum injection method, as in producing processes of the liquid crystal display panel according to the related art. As described below, in a case of producing the scanning antenna according to the present embodiment, it is preferable to use the vacuum injection method.

The electrodes (the patch electrode 15 and the slot electrode 55) having a thickness of, for example, from 1 micrometer to several micrometers are provided on the respective substrates (the TFT substrate 101 and the slot substrate 201) of the scanning antenna, and as described above, the large step structures (concave-convex structures) exist in the respective substrates. When an alignment film solution is applied to such substrates, the alignment film solution flows into concave portions, such that thicknesses of the alignment films in the vicinity of the concave portions become large, for example, from several hundreds nanometers to several micrometers. In addition, areas of the alignment films are also much larger that of the liquid crystal display panel according to the related art. For this reason, it can be said that an alignment film material is in a state where it is easy for the alignment film material to absorb a large amount of moisture in an environment (in the atmosphere) between a process of forming the alignment film (film forming process) and a process of filling the liquid crystal between the substrates, in producing processes of the scanning antenna. However, in the present embodiment, since the acrylic alignment film (the polymer film containing the acrylic polymer) as described above is used as the alignment film M, absorption of the moisture by the alignment film M is suppressed. Since it is very difficult for the acrylic resin to absorb the moisture as compared with, for example, a polyimide resin, generation of gas from the alignment film M due to a degassing/heating process in the process of filling the liquid crystal material, a temperature change/pressure change at the time of using the completed scanning antenna, or the like is suppressed. Therefore, according to the method of producing a scanning antenna according to the present embodiment, it is possible to produce a liquid crystal antenna panel (a composite panel of the scanning antenna) in which generation of air bubbles is suppressed with a high yield.

After the liquid crystal antenna panel is produced, the reflective conductive plate 65 is appropriately assembled to the liquid crystal antenna panel so as to face an opposite surface 51b of the slot substrate 201 (second dielectric substrate 51) with the dielectric layer (air layer) 54 interposed therebetween. Through such processes, the scanning antenna according to the present embodiment is produced.

In the above embodiment, the acrylic alignment films are used as the respective alignment films M1 and M2 of the TFT substrate and the slot substrate included in the scanning antenna. When it is appropriate to use the acrylic alignment films as the alignment films as described above, the acrylic alignment films may be used in various substrates (for example, a substrate for a liquid crystal display device having a large concave-convex structure formed on a surface thereof) other than substrates for the scanning antenna.

EXAMPLE

Hereinafter, the present invention will be described in more detail based on examples. It should be noted that the present invention is not limited at all by these examples.

Example 1

A TFT substrate having the same basic configuration as that of the TFT substrate 101 exemplified in the first embodiment and a slot substrate 201 having the same basic configuration as that of the slot substrate 201 exemplified in the first embodiment were prepared, respectively. It should be noted that both of a patch electrode of the TFT substrate and a slot electrode of the slot substrate are formed of aluminum. In addition, a thickness of the patch electrode was set to 2 μm, and a thickness of the slot electrode was set to 4 μm.

An alignment film solution containing polymethyl methacrylate as a main component was applied to a surface of the TFT substrate facing a liquid crystal layer so as to cover the patch electrode. A mixed solvent in which N-methyl-2-pyrrolidone (NMP) and butyl cellosolve were mixed with each other at a volume ratio of 1:1 was used as a solvent of the alignment film solution. In addition, the alignment film solution was also applied to a surface of the slot substrate facing the liquid crystal layer so as to cover the slot electrode.

Coated films formed on the TFT substrate and the slot substrate and formed of the alignment film solution were heated at 70° C. for 5 minutes, and were then further heated at 150° C. for 30 minutes. Then, rubbing processing (alignment processing) was performed on the respective coated films of the TFT substrate and the slot substrate to form alignment films on the respective surfaces of the TFT substrate and the slot substrate, respectively.

A thermosetting sealant (trade name "HC-1413FP" produced by Mitsui Chemicals, Inc.) was drawn in a frame shape on surfaces (the surface facing liquid crystal layer and a surface facing the alignment film) of the TFT substrate using a seal dispenser, and a liquid crystal material was then provided in a drawn frame by an ODF method. Then, the slot substrate was bonded to the TFT substrate through the thermosetting sealant. 4-Cyano-4'-pentylbiphenyl (5CB) having a —CN group (cyano group or nitrile group) at a terminal thereof was used as the liquid crystal material (liquid crystal compound).

After the substrates are bonded to each other, the substrates bonded to each other were heated at 130° C. for 40 minutes to perform hardening of the thermosetting sealant and realignment processing of the liquid crystal compound, thereby obtaining a composite panel according to Example 1 in which the liquid crystal compound was uniformly uniaxially aligned.

Comparative Example 1

A composite panel according to Comparative Example 1 was produced in the same manner as in Example 1 except that an alignment film material containing a polyamic acid as a main component was used as an alignment film material for forming an alignment film and coated films of the alignment film material were heated at 70° C. for 5 minutes and were then further heated at 200° C. for 30 minutes.

[Evaluation 1: Measurement of Amount of Desorbed Gas]

Figure 8:
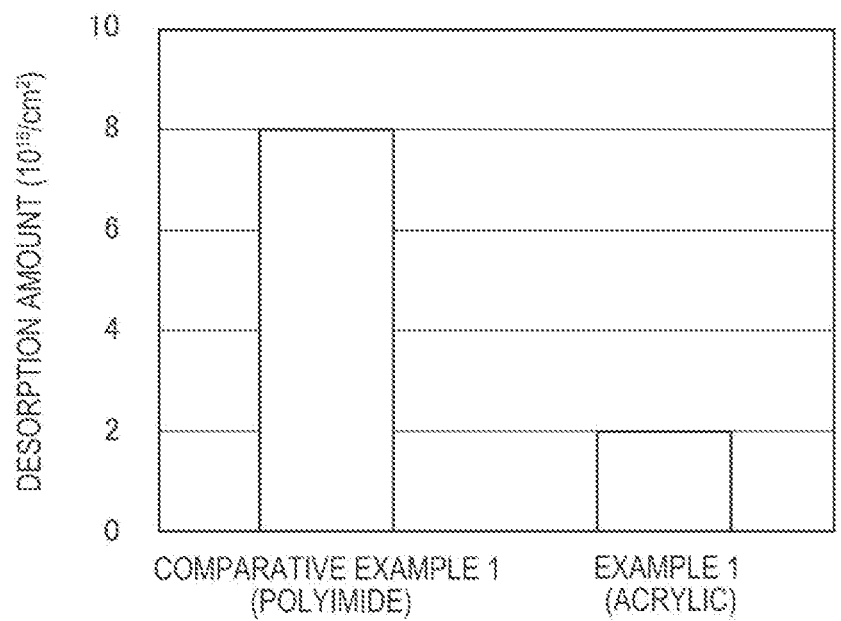
FIG. 8 is graphs showing measurement results of amounts of desorbed gas in alignment films according to Example 1 and Comparative Example 1.

Amounts of desorbed gas of Example 1 and Comparative Example 1 were measured using a thermal desorption spectroscopy (TDS). Specifically, an acrylic alignment film of Example 1 and a polyimide alignment film of Comparative Example 1 were respectively formed on a raw glass, and amounts of gas (amounts of desorbed gas) desorbed from the respective alignment films when these alignment films are heated from room temperature (23° C.) to 150° C. under an atmospheric pressure condition of $10^{-7}$ Pa were measured. FIG. 8 is graphs showing measurement results of amounts of desorbed gas in alignment films according to Example 1 and Comparative Example 1. A vertical axis in FIG. 8 is a desorption amount ($10^{15}/cm^2$) of gas (mass number: 18 and $H_2O$). As shown in FIG. 8, it was confirmed that an amount of desorbed water vapor in the acrylic alignment film of Example 1 was much smaller than that of the polyimide alignment film of Comparative Example 1. Therefore, it can be said that when the acrylic alignment film is used, it is possible to produce a composite panel while suppressing generation of air bubbles.

[Evaluation 2: Presence/Absence of Air Bubbles in Initial State]

Five composite panels according to Example 1 and five composite panels according to Comparative Example 1 were prepared. With respect to each composite panel according to Example 1 and each composite panel according to Comparative Example 1, states (initial states) immediately after the composite panes are produced were confirmed with the naked eyes in order to confirm whether or not air bubbles were generated. As a result, air bubbles were not confirmed in any of the composite panels according to Example 1. In contrast, in Comparative Example 1, air bubbles were confirmed in one of the five composite panels.

[Evaluation 3: Presence/Absence of Air Bubbles after Decompression Test]

After the initial states are confirmed as described above, a decompression test that each composite panel according to Example 1 and each composite panel according to Comparative Example 1 are left under an environment of 70° C. and 50 kPa for 100 hours was performed. With respect to each composite panel after the decompression test, it was confirmed with the naked eyes whether or not air bubbles were generated. As a result, air bubbles were not confirmed in any of the composite panels according to Example 1. In contrast, in Comparative Example 1, air bubbles were confirmed in three of the five composite panels. In a case where the air bubbles are present in the composite panel as in Comparative Example 1, the composite panel is not properly operated when a voltage is applied to the composite panel, and does not function as an antenna.

Example 2

A composite panel according to Example 2 was produced in the same manner as in Example 1 except that an acrylic photo-alignment film was used as an alignment film and photo-alignment processing instead of the rubbing processing was performed as alignment processing.

A photoreactive (meth)acrylate polymer (that is, a photoreactive acrylic polymer) represented by Chemical Formula (2) described above was used as the acrylic photoalignment film of Example 2. In Chemical Formula (2), $R^3$ is a methyl group, $R^4$ is $C_5H_{10}$, and $R^5$ is H. In addition, a mixed solvent in which N-methyl-2-pyrrolidone (NMP) and butyl cellosolve were mixed with each other at a volume ratio of 1:1 was used as a solvent for dissolving the acrylic polymer of Example 2.

In addition, as the photo-alignment processing, a linearly polarized ultraviolet ray was irradiated to a coated film of the acrylic polymer from a direction inclined from a normal direction of substrates (a TFT substrate and a slot substrate) by 40°. An amount of irradiated linearly polarized ultraviolet ray was 100 mJ/cm$^2$ in the vicinity of a center wavelength of 313 nm.

Evaluation of Example 2

A total of five composite panels according to Example 2 were prepared in the same manner as in Example 1, and initial states and presence/absence of air bubbles after a decompression test were confirmed for the five composite panels in the same manner as in Example 1. As a result, in Example 2, air bubbles were not observed in all of the composite panels in the initial state and after the decompression test.

Example 3

A composite panel according to Example 3 was produced in the same manner as in Example 1 except that copper (Cu) was used as a material of each of a patch electrode of a TFT substrate and a slot electrode of a slot substrate, a thickness of the patch electrode was set to 1 µm, and a thickness of the slot electrode was set to 2 µm.

The electrodes are required to have a predetermined thickness or more in order to obtain desired antenna performance, but the thickness of each of the electrodes can be reduced by using copper (Cu) instead of aluminum (Al) as the material of each of the electrodes. When the thickness of each of the electrodes is small, amounts of alignment film accumulated in concave portions of the respective substrates are also decreased, such that amounts of gas generated from the alignment films are further decreased, and generation of air bubbles is suppressed.

Evaluation of Example 3

A total of five composite panels according to Example 3 were prepared in the same manner as in Example 1, and initial states and presence/absence of air bubbles after a decompression test were confirmed for the five composite panels in the same manner as in Example 1. As a result, in Example 3, air bubbles were not observed in all of the composite panels in the initial state and after the decompression test.

Example 4

A composite panel according to Example 4 was produced in the same manner as in Example 1 except that 4-cyano-4'-pentyloxybiphenyl (5OCB) having a —CN group (a cyano group or a nitrile group) at a terminal thereof and having a —O— bond (ether bond) in a molecule was used as a liquid crystal material (liquid crystal compound).

Solubility of water for a liquid crystal layer becomes high by using a liquid crystal material having a high polarity as a liquid crystal material (liquid crystal compound). For this reason, even in a case where moisture is generated from an alignment film, it is possible to dissolve the moisture in a liquid crystal to prevent generation of air bubbles.

Evaluation of Example 4

A total of five composite panels according to Example 4 were prepared in the same manner as in Example 1, and initial states and presence/absence of air bubbles after a decompression test were confirmed for the five composite panels in the same manner as in Example 1. As a result, in Example 4, air bubbles were not observed in all of the composite panels in the initial state and after the decompression test.

Example 5

A composite panel according to Example 5 was produced in the same manner as in Example 1 except that a liquid crystal material was filled between substrates by a vacuum injection method instead of the ODF method.

Figure 9:
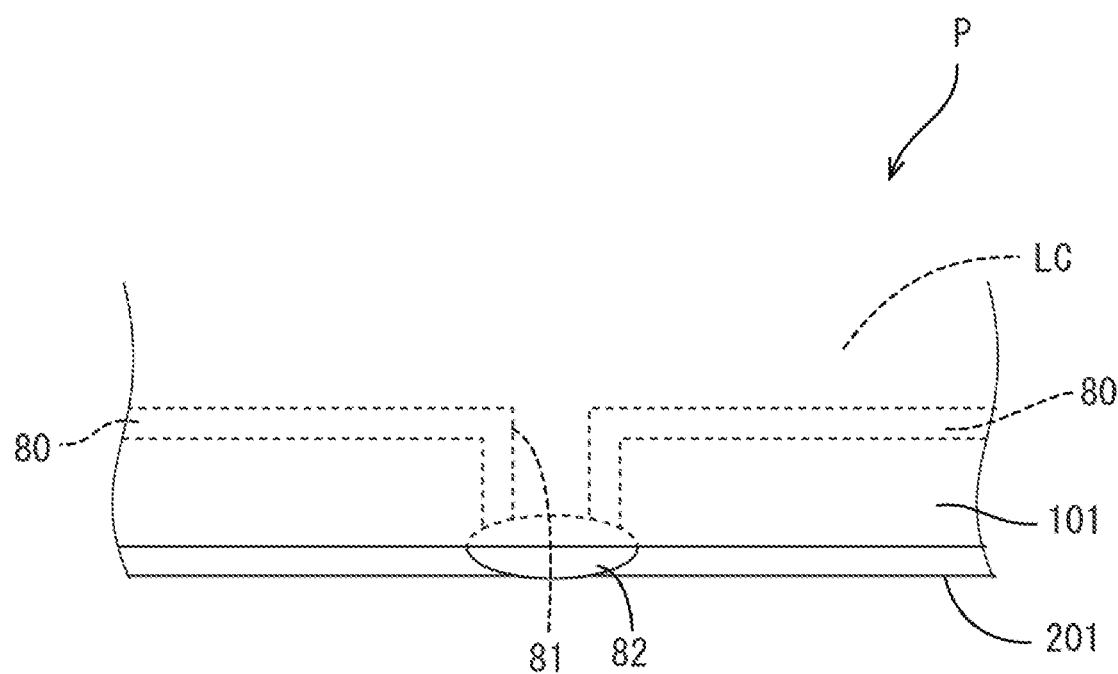
FIG. 9 is an enlarged plan view schematically showing the vicinity of a liquid crystal injection port of a composite panel into which a liquid crystal layer is injected by a vacuum injection method.

In Example 5, a thermosetting sealant was drawn in a frame shape on a surface of a TFT substrate using a seal dispenser, as in Example 1, the TFT substrate and a slot substrate were bonded to each other before a liquid crystal was filled, and were heated at 130° C. for 40 minutes, such that an empty panel in which the liquid crystal was not filled was produced. The liquid crystal material was filled in the empty panel by the vacuum injection method. FIG. 9 is an enlarged plan view schematically showing the vicinity of a liquid crystal injection port 81 of a composite panel into which a liquid crystal layer LC is injected by the vacuum injection method. The liquid crystal injection port 81 is formed of a hole portion penetrating through an inner side (liquid crystal layer LC side) and an outer side in a part of the sealant 80 drawn in the frame shape. In FIG. 9, a part of the composite panel P according to Example 5 in which the TFT substrate 101 and the slot substrate 201 are bonded to each other with the sealant 80 interposed therebetween is schematically shown. After the liquid crystal material (liquid crystal layer LC) is injected between the substrates 101 and 201, the liquid crystal injection port 81 is closed (sealed) by a sealing portion 82. As the sealing portion 82, the same material (thermosetting resin) as the sealant 80 may be used, or other materials having sealing performance may be used. Here, a trade name "TB3026E" (manufactured by Three-Bond Co., Ltd.) was used as the sealing portion 82.

In the vacuum injection method, a heating/degassing process is performed in a state of the empty panel (in a state before the liquid crystal material and an alignment film are in contact with each other). For this reason, it is possible to reduce an amount of absorbed moisture in the alignment film in advance at the time of injecting the liquid crystal. In this way, it is possible to further prevent generation of air bubbles after the injection of the liquid crystal.

Evaluation of Example 5

A total of five composite panels according to Example 5 were prepared in the same manner as in Example 1, and initial states and presence/absence of air bubbles after a decompression test were confirmed for the five composite panels in the same manner as in Example 1. As a result, in Example 5, air bubbles were not observed in all of the composite panels in the initial state and after the decompression test.

EXPLANATION OF SYMBOLS

1: Dielectric substrate (First dielectric substrate)
3: Gate electrode

4: Gate insulating layer
5: Semiconductor layer
6D: Drain contact layer
6S: Source contact layer
7D: Drain electrode
7S: Source electrode
10: TFT
11: First insulating layer
15: Patch electrode
17: Second insulating layer
51: Dielectric substrate (Second dielectric substrate)
55: Slot electrode
55L: Lower layer
55M: Main layer
55U: Upper layer
57: Slot
57U: Slot electrode unit
58: Third electrode
70: Feeding device
72: Feeding pin
80: Sealant
81: Liquid crystal injection port
82: Sealing portion
101: TFT substrate
201: Slot substrate
1000: Scanning antenna
U: Antenna unit (Antenna unit region)
CH1: Contact hole
LC: Liquid crystal layer
P: Composite panel
GD: Gate driver
GL: Gate bus line
GT: Gate terminal portion
SD: Source driver
SL: Source bus line
ST: Source terminal portion
PT: Transfer terminal portion
R1: Transmission/reception region
R2: Non-transmission/reception region
Rs: Seal region

The invention claimed is:

1. A scanning antenna in which a plurality of antenna units is arranged, comprising:
a thin film transistor (TFT) substrate that includes
a first dielectric substrate,
a plurality of TFTs and a plurality of patch electrodes supported by the first dielectric substrate, the patch electrodes being electrically connected to the TFTs, and
a first alignment film disposed so as to cover the TFTs and the patch electrodes;
a slot substrate that includes
a second dielectric substrate,
a slot electrode supported by the second dielectric substrate and including a plurality of slots, and
a second alignment film disposed so as to cover the slot electrode;
a liquid crystal layer that is interposed between the TFT substrate and the slot substrate of which the first alignment film and the second alignment film face each other; and
a reflective conductive plate that is disposed so as to face an opposite surface of the second dielectric substrate on which the slot electrode is not formed, with a dielectric layer interposed therebetween,
wherein the first alignment film and the second alignment film are acrylic alignment films containing an acrylic polymer.

2. The scanning antenna according to claim 1, wherein the acrylic alignment film is a photoreactive acrylic alignment film that exhibits a function of aligning a liquid crystal compound in the liquid crystal layer in a specific direction when light is irradiated.

3. The scanning antenna according to claim 2, wherein the photoreactive acrylic alignment film contains a photoreactive acrylic polymer containing a constitutional unit derived from an acrylic monomer having a photoreactive functional group at a side chain thereof.

4. The scanning antenna according to claim 1, wherein a liquid crystal compound in the liquid crystal layer has at least one functional group selected from a group consisting of a F group, a Cl group, a Br group, a SCN group, a NCS group, a CN group, a OCN group, a NCO group, a $CF_3$ group, a $OCF_3$ group, and a $SF_5$ group at a terminal thereof.

5. The scanning antenna according to claim 1, wherein a liquid crystal compound in the liquid crystal layer has at least one bond selected from a group consisting of a carbon-carbon triple bond, —CH=CH—, —CF=CF—, —CF=CH—, —CH=CF—, —(CO)O—, —O(CO)—, and —O—.

6. The scanning antenna according to claim 1, wherein the patch electrode and/or the slot electrode are formed of copper.

7. The scanning antenna according to claim 1, further comprising:
a sealant that is interposed between the TFT substrate and the slot substrate so as to be adhered to each of the TFT substrate and the slot substrate while surrounding the liquid crystal layer, wherein the sealant has a liquid crystal injection port formed of a hole portion penetrating through a liquid crystal layer side and an outer side and used when a liquid crystal compound constituting the liquid crystal layer is injected between the TFT substrate and the slot substrate by a vacuum injection method, and
a sealing portion sealing the liquid crystal injection port.

8. A method of producing the scanning antenna according to claim 1, wherein the liquid crystal layer is formed by a vacuum injection method.

* * * * *